(12) United States Patent
Seo et al.

(10) Patent No.: US 9,357,535 B2
(45) Date of Patent: May 31, 2016

(54) METHOD AND DEVICE FOR TRANSMITTING REFERENCE SIGNAL IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 61 days.

(21) Appl. No.: 14/357,700

(22) PCT Filed: Nov. 13, 2012

(86) PCT No.: PCT/KR2012/009546
§ 371 (c)(1),
(2) Date: May 12, 2014

(87) PCT Pub. No.: WO2013/070052
PCT Pub. Date: May 16, 2013

(65) Prior Publication Data
US 2014/0341114 A1 Nov. 20, 2014

Related U.S. Application Data

(60) Provisional application No. 61/559,138, filed on Nov. 13, 2011.

(51) Int. Cl.
*H04W 72/04* (2009.01)
*H04B 7/06* (2006.01)
(Continued)

(52) U.S. Cl.
CPC ......... *H04W 72/0413* (2013.01); *H04B 7/0684* (2013.01); *H04B 7/0691* (2013.01); *H04B 7/0697* (2013.01); *H04L 5/0053* (2013.01); *H04L 27/2613* (2013.01)

(58) Field of Classification Search
None
See application file for complete search history.

(56) References Cited

U.S. PATENT DOCUMENTS 8,289,917 B1 * 10/2012 Koivisto ............... H04L 5/0048
370/252
2010/0322178 A1 * 12/2010 Li ......................... H04L 5/0053
370/329
(Continued)

FOREIGN PATENT DOCUMENTS

KR 10-2011-0020719 A 3/2011
KR 10-2011-0031928 A 3/2011
(Continued)

*Primary Examiner* — Candal Elpenord
(74) *Attorney, Agent, or Firm* — Birch, Stewart, Kolasch & Birch, LLP

(57) ABSTRACT

A method for transmitting a reference signal by a base station (BS) in a wireless communication system; and the BS are discussed. The method according to one embodiment includes generating a reference signal sequence; applying an orthogonal sequence to the reference signal sequence; and mapping the reference signal sequence to which the orthogonal sequence is applied to a resource for each antenna port. One antenna port is included any one of first and second antenna port sets, and a configuration of antenna ports contained in each antenna port set is changed according to a number of available resource elements (REs) of a physical resource block (PRB) pair. If the number of available REs is lower than a predetermined threshold value, each of the first and second antenna port sets includes antenna ports corresponding to orthogonal sequences capable of performing despreading using a spreading factor.

13 Claims, 9 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2013/0039291 A1* | 2/2013 | Blankenship | H04L 5/001 370/329 |
| 2013/0044692 A1* | 2/2013 | Nory | H04L 25/0228 370/329 |
| 2013/0044727 A1* | 2/2013 | Nory | H04L 5/0092 370/330 |
| 2013/0064216 A1* | 3/2013 | Gao | H04L 5/0016 370/330 |
| 2013/0336256 A1 | 12/2013 | Chung et al. | |
| 2013/0343311 A1 | 12/2013 | Tee et al. | |
| 2014/0029545 A1 | 1/2014 | Kim et al. | |

FOREIGN PATENT DOCUMENTS

| | | |
|---|---|---|
| KR | 10-2011-0084892 A | 7/2011 |
| KR | 10-2011-0084976 A | 7/2011 |
| WO | WO 2011/025202 A2 | 3/2011 |

* cited by examiner

FIG. 5
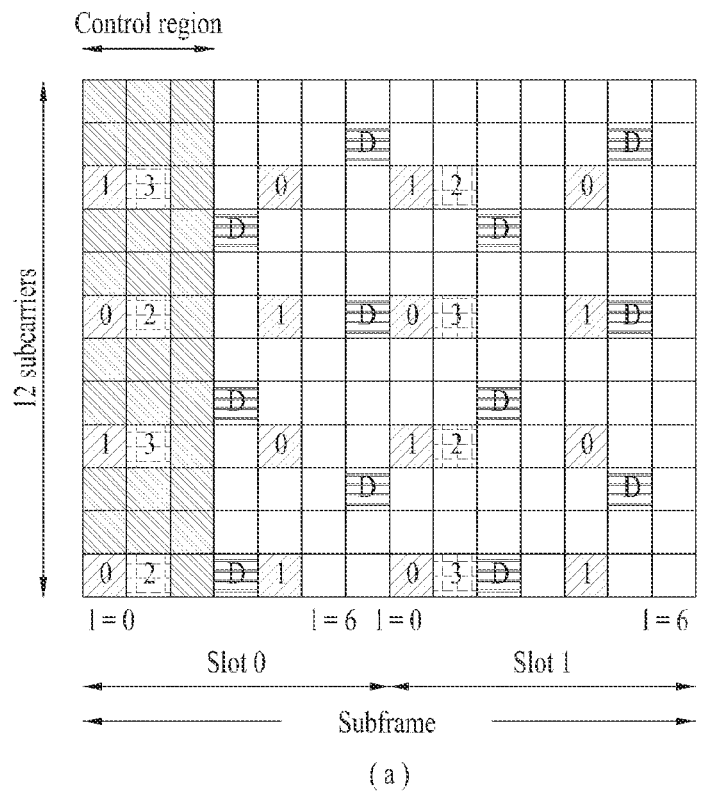
(a)
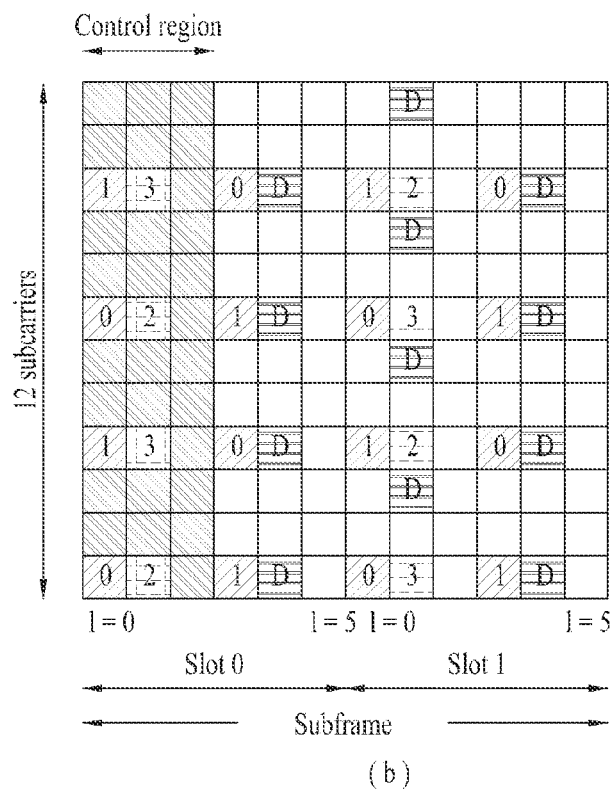
(b)

METHOD AND DEVICE FOR TRANSMITTING REFERENCE SIGNAL IN WIRELESS COMMUNICATION SYSTEM

This application is the National Phase of PCT/KR2012/009546 filed on Nov. 13, 2012 which claims priority under 35 U.S.C. 119(e) to U.S. Provisional Application No. 61/559,138 filed on Nov. 13, 2011, all of which are hereby expressly incorporated by reference into the present application.

TECHNICAL FIELD

Embodiments of the present invention relate to a wireless communication system, and more particularly to a method and apparatus for transmitting a demodulation reference signal (DMRS) for E-PDCCH.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method for increasing the amount of resources needed for E-PDCCH transmission through a method for differently establishing an antenna port included in or mapped to an antenna port set according to the amount of available resources.

It is to be understood that technical objects to be achieved by the present invention are not limited to the aforementioned technical objects and other technical objects which are not mentioned herein will be apparent from the following description to one of ordinary skill in the art to which the present invention pertains

Technical Solution

The object of the present invention can be achieved by providing a method for transmitting a reference signal by a base station (BS) in a wireless communication system including: generating a reference signal sequence; and applying an orthogonal sequence to the reference signal sequence, and mapping the reference signal sequence to which the orthogonal sequence is applied to a resource for each antenna port, wherein the antenna port is included any one of the first and second antenna port sets, and a configuration of antenna ports contained in each antenna port set is changed according to the number of available resource elements (REs) of a physical resource block (PRB) pair.

In accordance with another aspect of the present invention, a base station (BS) device for use in a wireless communication system includes: a transmission (Tx) module; and a processor, wherein the processor is configured to generate a reference signal sequence, to apply an orthogonal sequence to the reference signal sequence, and to map the reference signal sequence to which the orthogonal sequence is applied to a resource for each antenna port, where the antenna port includes any one of the first and second antenna port sets, and a configuration of antenna ports contained in each antenna port set is changed according to the number of available resource elements (REs) of a physical resource block (PRB) pair.

The first and second technical aspects may include all or some parts of the following items.

If the number of available REs may be less than a predetermined threshold value and 4 or fewer antenna ports are used, only 12 demodulation reference signals (DMRSs) REs may used for a user equipment (UE) decoding the reference signal.

If the number of available REs is lower than a predetermined threshold value, the first antenna port set may include antenna ports corresponding to orthogonal sequences capable of performing despreading using any one of spreading factors 2 and 4, and the second antenna port set may include antenna ports corresponding to orthogonal sequences capable of performing despreading using the spreading factor of 4.

The first antenna port set may include antenna ports 7, 8, 9, and 10, and the second antenna port set includes antenna ports 11, 12, 13, and 14. If the number of available REs is higher than a predetermined threshold value, the first antenna port set may include antenna ports 7, 8, 11, and 13, and the second antenna port set may include antenna ports 9, 10, 12, and 14. The base station (BS) may primarily use antenna ports contained in the first antenna port set when data is mapped to a resource for each antenna port. The number of available REs may indicate resource elements available in an Enhanced-Physical Downlink Control Channel (E-PDCCH). Resources mapped to a reference signal sequence to which the orthogonal sequence is applied may be identical to each other within one antenna port set.

The reference signal may be a demodulation reference signal (DMRS) for decoding an Enhanced-Physical Downlink Control Channel (E-PDCCH).

If a subframe to which the reference signal is transmitted is a special subframe, the first antenna port set may include antenna ports corresponding to orthogonal sequences capable of performing despreading using any one of spreading factors 2 and 4, and the second antenna port set may include antenna ports corresponding to orthogonal sequences capable of performing despreading using the spreading factor of 4.

If the number of UEs multiplexed on the PRB pair is lower than a predetermined value, the first antenna port set may include antenna ports corresponding to orthogonal sequences capable of performing despreading using any one of spreading factors 2 and 4, and the second antenna port set may include antenna ports corresponding to orthogonal sequences capable of performing despreading using the spreading factor of 4.

The number of antenna ports for transmission of the reference signal may be identical to the number of user equipments (UEs) multiplexed on the PRB pair.

Advantageous Effects

As is apparent from the above description, exemplary embodiments of the present invention can obtain a large amount of resources needed for E-PDCCH transmission.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

BEST MODE

Figure 1:
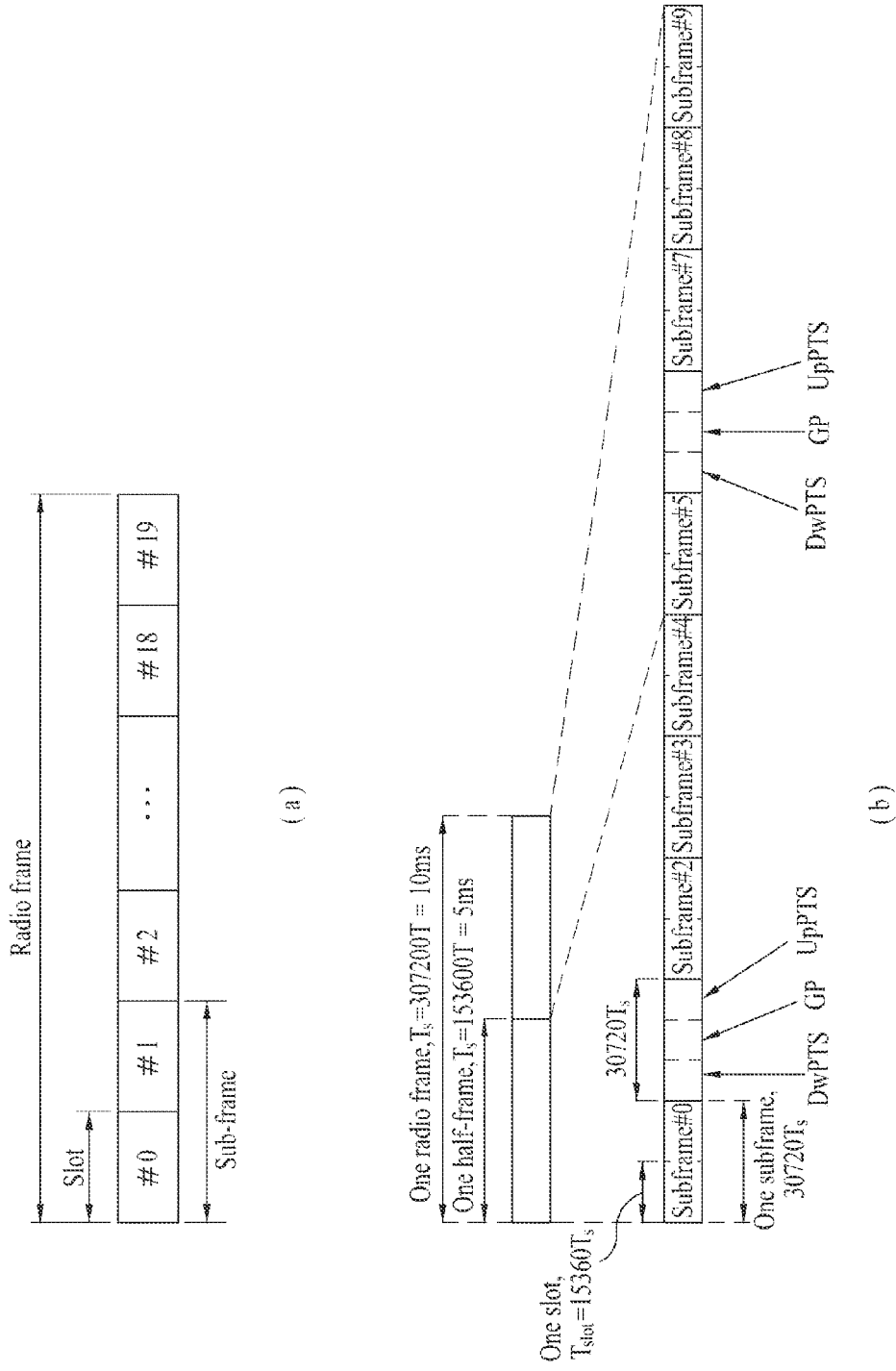
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1($a$) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
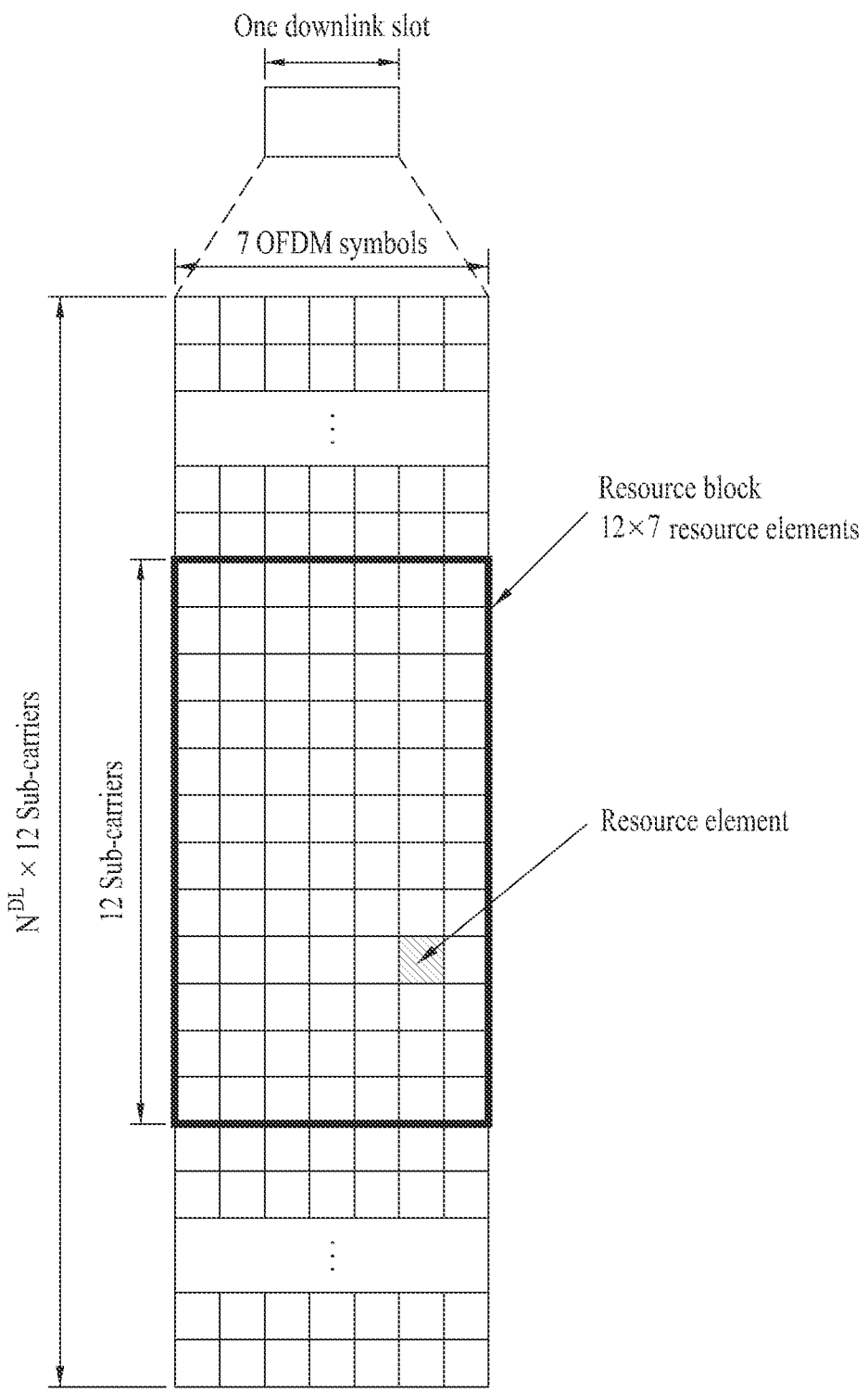
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
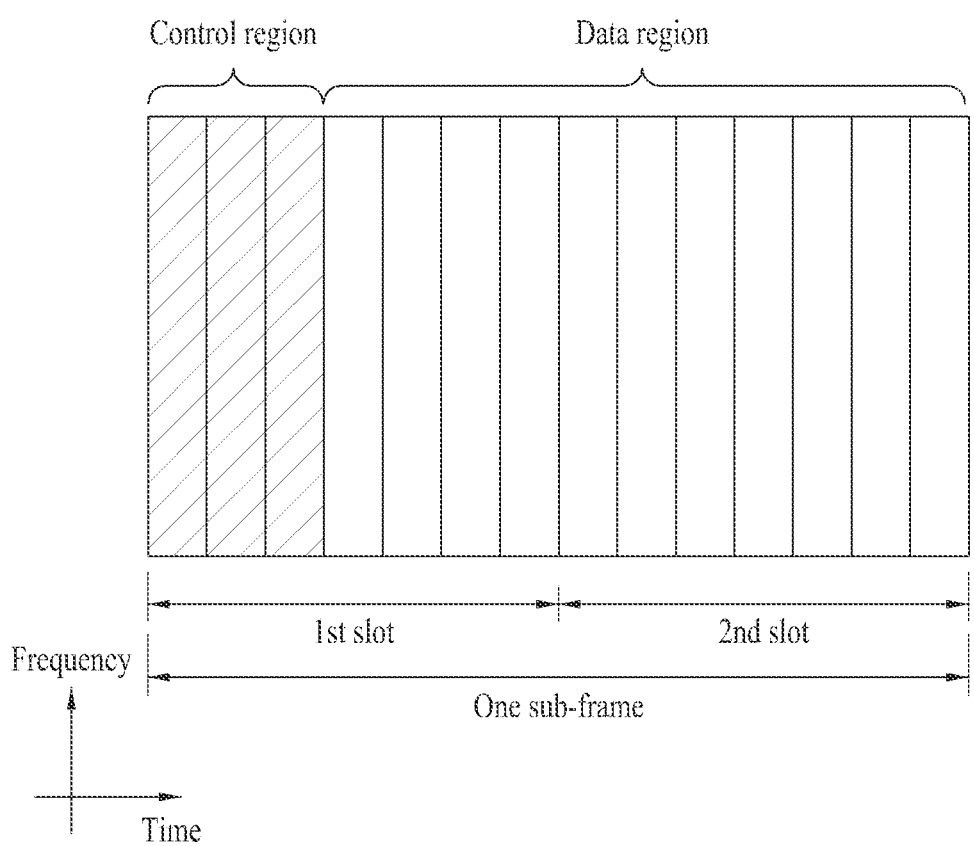
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
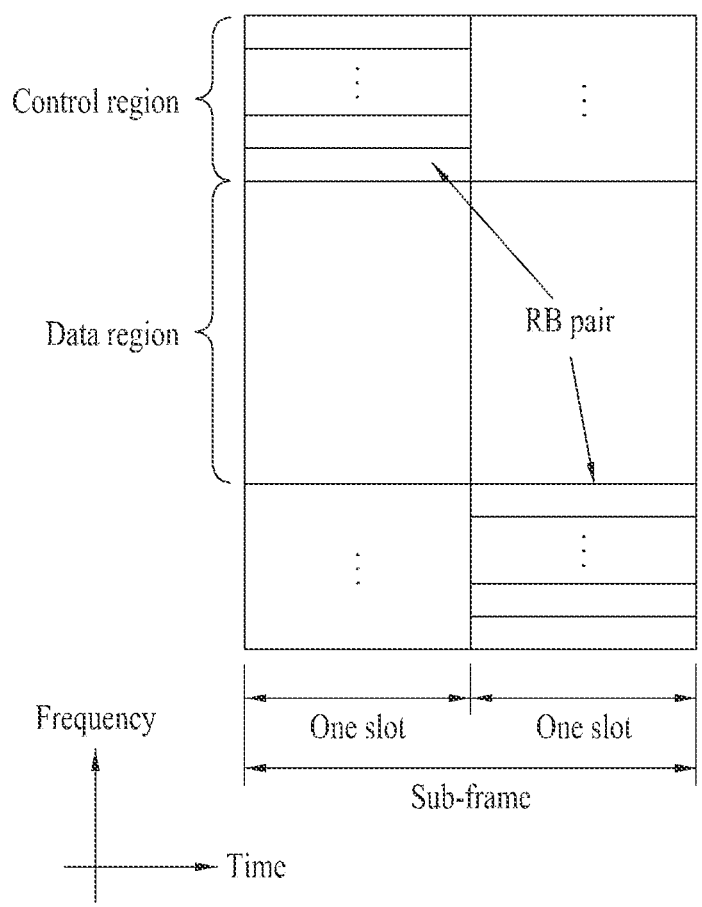
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:
i) a UE-specific reference signal for a specific UE,
ii) a demodulation-reference signal (DM-RS) transmitted for coherent demodulation if a PDSCH is transmitted,
iii) a channel state information-reference signal (CSI-RS) for delivering channel state information (CSI) if a downlink DMRS is transmitted,
iv) an MBSFN reference signal transmitted for coherent demodulation of a signal transmitted in a multimedia broadcast single frequency network (MBSFN) mode, and
v) a positioning reference signal used to estimate geographical position information of the UE.

The reference signals may be broadly divided into two types according to the purpose thereof; a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

Figure 7:
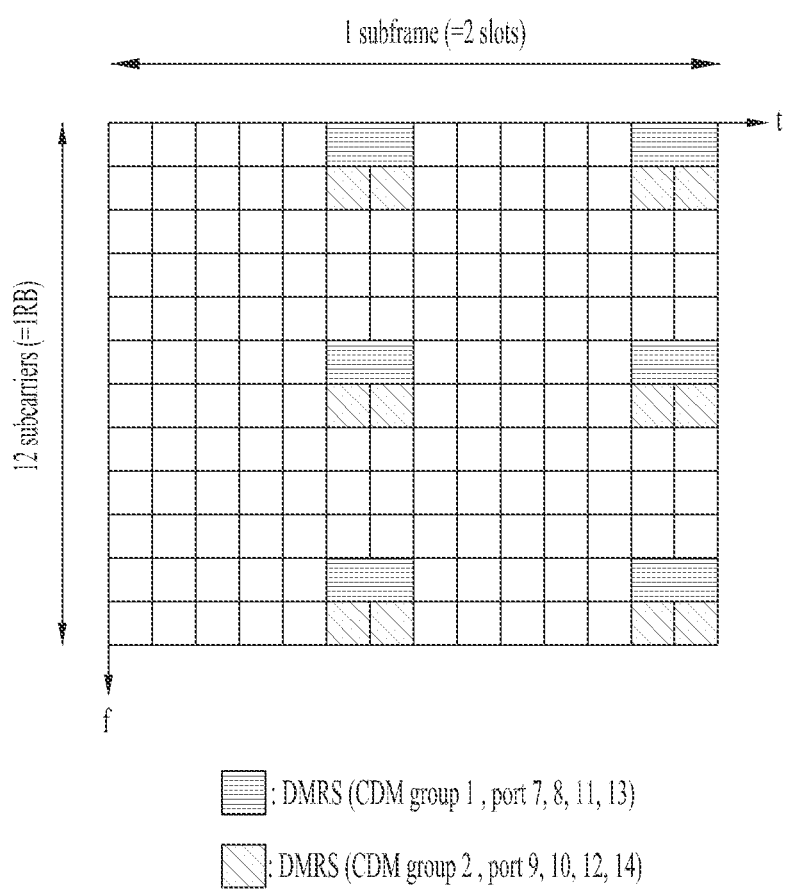

FIG. 7 is a diagram illustrating a pattern in which CRSs and DRSs defined in a legacy 3GPP LTE system (e.g., release-8) are mapped to resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 7(*a*)) and 12 OFDM symbols in case of an extended CP (FIG. 7(*b*)).

FIG. 7 shows locations of the reference signals on the RB pairs in a system in which the base station supports four transmit antennas. In FIG. 7, resource elements (REs) denoted by "0", "1", "2" and "3" represent the locations of the CRSs for antenna port indices 0, 1, 2 and 3. Meanwhile, the RE denoted by "D" represents the location of the DMRS.

Demodulation Reference Signal (DMRS)

DMRS is a reference signal that is defined by a UE to implement channel estimation for PDSCH. DMRS may be used in Tx ports 7, 8, and 9. In the initial stages, although DMRS has been defined for transmission of a single layer corresponding to an antenna port 5, the DMRS has been extended for spatial multiplexing of a maximum of 8 layers. DMRS is transmitted only for a single specific UE as can be seen from a UE-specific reference signal (RS) corresponding to a different name of DMRS. Accordingly, DMRS can be transmitted only in an RB in which PDSCH for the specific UE is transmitted.

Figure 6:
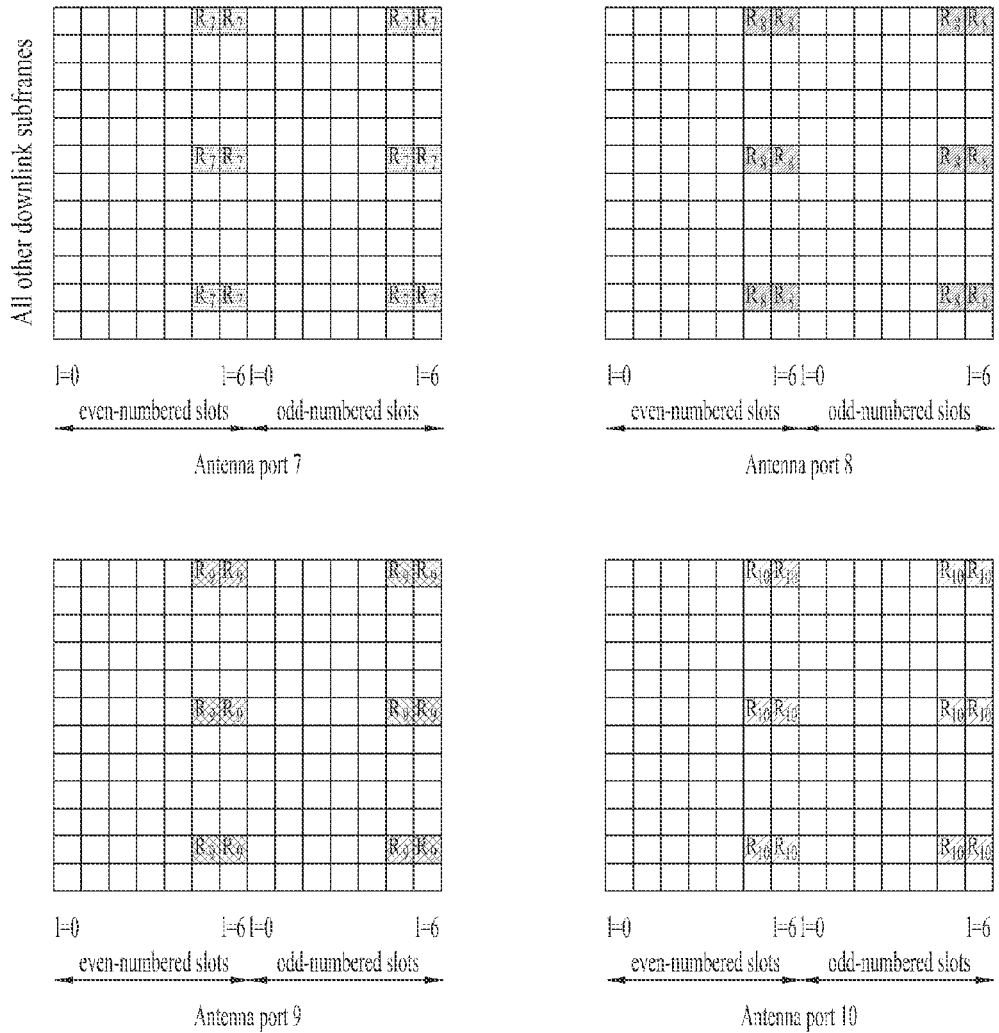
FIGS. 6 to 7 are conceptual diagrams illustrating a demodulation reference signal (DMRS).

DMRS generation for a maximum of 8 layers will hereinafter be described in detail. In case of DMRS, a reference signal sequence r(m) generated by Equation 1 may be mapped to a complex-valued modulation symbols $\alpha_{k,l}^{(p)}$ obtained by Equation 2. FIG. 6 shows that DMRS is mapped to a resource grid of a subframe in case of a general CP, and relates to antenna ports 7 to 0.

$$r(m) = \frac{1}{\sqrt{2}}(1 - 2\cdot c(2m)) + j\frac{1}{\sqrt{2}}(1 - 2\cdot c(2m+1)),$$ [Equation 1]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 1, r(m) is a reference signal sequence, c(i) is a pseudo-random sequence, and $N_{RB}^{max,DL}$ is a maximum number of RBs of a downlink bandwidth.

$$a_{k,l}^{(p)} = w_p(l')\cdot r(3\cdot l' \cdot N_{RB}^{max,DL} + 3\cdot n_{PRB} + m')$$ [Equation 2]

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB}n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{Case of special subframe configurations 3, 4, 8, 9} \\ l'\bmod 2 + 2 + 3\lfloor l'/2 \rfloor & \text{Case of special subframe configurations 1, 2, 6, 7} \\ l'\bmod 2 + 5 & \text{Case in which special subframe is not given} \end{cases}$$

$$l = \begin{cases} 0, 1, 2, 3 & n_s\bmod 2 = 0, \text{Case of special subframe configurations 1, 2, 6, 7} \\ 0, 1 & n_s\bmod 2 = 0, \text{Case in which special subframe configurations 1, 2, 6, 7 are not given} \\ 2, 3 & n_s\bmod 2 = 1, \text{Case in which special subframe configurations 1, 2, 6, 7 are not given} \end{cases}$$

$$m' = 0, 1, 2$$

As can be seen from Equation 2, an orthogonal sequence $\overline{w}_p(i)$ shown in the following Table 1 is applied to the reference signal sequence r(m) when r(m) is mapped to a complex modulation symbol.

TABLE 1

| Antenna port $p$ | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

DMRS may perform channel estimation in different ways according to a spreading factor of 2 or 4. Referring to Table 1, an orthogonal sequence is repeated in the form of [a b a b] at antenna ports 7 to 10, such that the spreading factor is set to 2 (or 4) at antenna ports 7-10 and the spreading factor is set to 4 at antenna ports 11~14. In case that the spreading factor is set to 2, a UE may despread each of a DMRS of a first slot and a DMRS of a second slot to the spreading factor of 2, and then performs channel estimation through time interpolation. If the spreading factor is set to 4, DMRS of the entire subframe is despread to the spreading factor of 4 at one time, such that channel estimation can be performed.

In the case of using the spreading factor of 2, the spreading-factor based channel estimation scheme may acquire not only a gain obtained because time interpolation is applied at high mobility, but also a gain of a decoding time because despreading to DMRS of the first slot is possible. In case of using the spreading factor of 4, the spreading-factor based channel estimation scheme can also support many more UEs or ranks.

The DMRS overhead aspect will hereinafter be described with reference to FIG. 7. FIG. 7 shows that DMRS is mapped to a subframe at each of the antenna ports 7 to 14. As shown in FIG. 7, DMRS may be classified into CDM (Code Divisional Multiplexing) Group 1 (or a first antenna port set) and CDM Group 2 (or a second antenna port set) according to a resource-grid mapping position. In an RE corresponding to CDM Group 1, DMRS is transmitted through antenna ports 7, 8, 11, and 13. In an RE corresponding to CDM Group 2, DMRS is transmitted through antenna ports 9, 10, 12, and 14. That is, REs used for DMRS transmission are identical in an antenna port contained in one CDM group. Assuming that DMRS is transmitted only using the antenna port corresponding to CDM Group 1, the number of resource elements (REs) needed for DMRS is 12. That is, DMRS overhead is denoted by 12. Likewise, if the antenna port corresponding to CDM Group 2 is used, DMRS overhead is denoted by 24.

In LTE from Release 11, an Enhanced-PDCCH (E-PDCCH) has been used to address not only insufficiency of PDCCH capacity caused by CoMP (Coordinate Multi Point) and MU-MIMO (Multi User-Multiple Input Multiple Output), but also reduction of PDCCH performance caused by inter-cell interference. In order to obtain precoding gain or the like, E-PDCCH may perform channel estimation on the basis of DMRS in a different way from the legacy CRS-based PDCCH.

E-PDCCH of Release 11 may be composed of FDM or (FDM+TDM). In accordance with E-PDCCH based on FDM, E-PDCCH of many UEs should be multiplexed to one PRB pair. For example, in case of using a normal CP, 168 REs are made available when PDCCH, CRS, and DMRS overhead are not considered in one PRB pair, and this means that the normal CP includes 4 CCEs (where CCE=36 REs). In addition, in the case of using E-PDCCH, if one CCE is divided into two sub-CCEs to obtain frequency diversity or the like and the two sub-CCEs are then transmitted, CCEs of different UEs may be contained in one PRB pair. This means that the UE should be identified by performing spreading with the spreading factor of 4. However, in case of considering REs needed for PDCCH, CRS, and DMRS overhead, if a guard period of a special subframe occupies a predetermined number of OFDM symbols in TDD, the amount of resources (i.e., the number of available REs) capable of being used as E-PDCCH is reduced.

As described above, a CDM group is established in the existing LTE/LTE-A system in such a manner that the CDM group is not dependent upon the numbering order of antenna ports contained in the CDM group. Therefore, if the antenna ports 7 and 8 are used only, DMRS overhead of only one PRB pair is set to 12. If the antenna ports 9 to 14 are used, DMRS overhead is increased to 24. As shown in the above example, under the condition that the number of available REs for E-PDCCH is reduced, a method for guaranteeing resources for E-PDCCH transmission by reducing the amount of DMRS overhead may be preferably used.

Accordingly, the present invention proposes methods for increasing the amount of resources for E-PDCCH transmission by adjusting the mapping relationship between a CDM group and an antenna port, and as such a detailed description thereof will hereinafter be described in detail.

Embodiment 1

Embodiment 1 relates to a method for performing DMRS mapping so as to primarily increase the spreading factor when the amount of available REs (this may also indicate other resources such as OFDM symbols) for E-PDCCH is equal to or less than a predetermined level due to a peripheral situation or a subframe structure (e.g., a special subframe of TDD).

Figure 8:
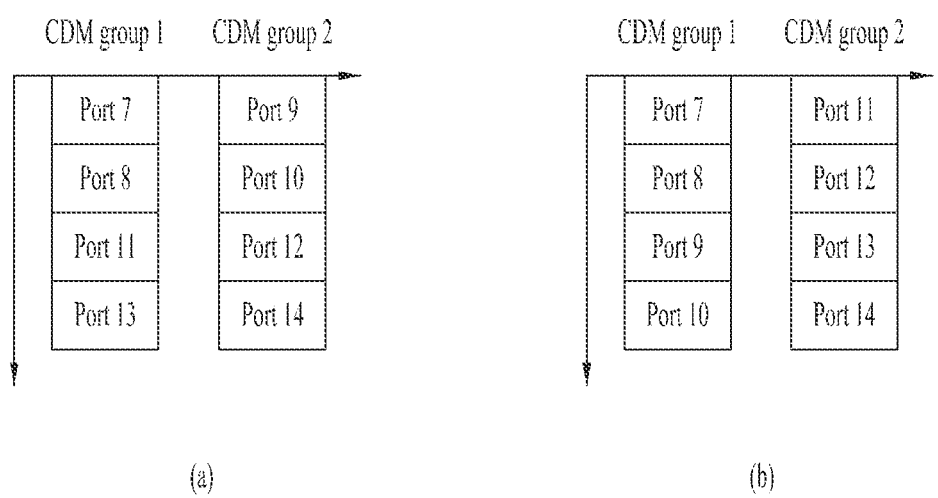
FIG. 8 is a conceptual diagram illustrating an embodiment of the present invention.

Referring to FIG. 8, FIG. 8(a) shows that a DMRS port is mapped to a CDM group when the amount of available resources for E-PDCCH transmission in a PRB pair is higher than (or is equal to or higher than) a predetermined threshold value. FIG. 8(b) shows that a DMRS port is mapped to a CDM group when the amount of available resources for E-PDCCH transmission in the PRB pair is less than (or is equal to or less than) a predetermined threshold value.

In this case, the relationship between each antenna port contained in each CDM group and an orthogonal sequence may be represented by Table 1. Antenna ports contained in one CDM group may use the same REs during each DMRS transmission. That is, antenna ports contained in each CDM group may be multiplexed to the same resources using different codes.

FIG. 8(a) shows that the amount of available resources for E-PDCCH is higher than a threshold value, antenna ports 7, 8, 11, and 13 are mapped to CDM Group 1 and antenna ports 9, 10, 12, and 14 are mapped to CDM Group 2.

FIG. 8(b) shows that the amount of available resources for E-PDCCH is lower than a threshold value. In FIG. 8(b), antenna ports 7, 8, 9, and 10 corresponding to an orthogonal sequence that can be despread with the spreading factor of 2 or 4 (that is, the spreading factor of 2 or 4 is possible, and one of the spreading factors can be selected according to the UE implementation scheme) are included in (or mapped to) CDM Group 1, and antenna ports 11, 12, 13, and 14 corresponding to an orthogonal sequence that can be despread with the spreading factor of 4 are included in (or mapped to) CDM Group 2. That is, if the amount of available resources for E-PDCCH is lower than a threshold value, the amount of resources for E-PDCCH transmission are increased, and at the same time antenna ports 7, 8, 9, and 10 are contained in one CDM group so as to obtain many more ranks. In this case, if the number of UEs multiplexed to a PRB pair (i.e., the number of antenna ports used in DMRS transmission) is equal to or less than 4, DMRS overhead is set to 2, such that many more REs can be acquired for E-PDCCH.

In the above-mentioned contents, the threshold value serving as a reference value of E-PDCCH transmission resources for deciding the DMRS port mapping scheme (See FIG. 8(*a*) or FIG. 8(*b*)) may be a predetermined value (e.g., 104 REs), and this information may be applied to UEs configured to receive the corresponding E-PDCCH through RRC signaling or the like. In addition, the threshold value may be decided on the basis of a coding rate caused by different sizes of DCI format. That is, if the coding rate is equal to or higher than a predetermined value, the mapping scheme of FIG. 8(*b*) may be used. If the coding rate is less than a predetermined value, the mapping scheme of FIG. 8(*a*) may be used.

The above-mentioned description may be applied according to a subframe structure. In more detail, in a special subframe of TDD, a guard period (GP) is inserted into a center part of the subframe so as to switch DL transmission and UL transmission, and UL timing advance, etc. can be adjusted or coordinated. In this case, the amount of resources for DL transmission is reduced, such that this means that the amount of available resources for E-PDCCH is reduced. Therefore, in this special subframe, DMRS port mapping may be used according to the method applied to the concept of FIG. 8(*b*). In this case, if the number of DMRS ports transmitted in the corresponding PRB pair is 4 or fewer, the number of REs needed for DMRS transmission is limited to 12, so that additional resources may be used for E-PDCCH transmission.

From the viewpoint of a UE, the amount of resources used in E-PDCCH transmission in the corresponding PRB pair can be estimated through various kinds of information received from the BS (i.e., the number of CCEs, the number of UEs configured to receive E-PDCCH in the corresponding PRB pair, the number of ports used in E-PDCCH transmission). The UE may directly receive the above information from the BS. In the above description, CCE may indicate the amount of resources needed for E-PDCCH that is applied to one UE within one PRB pair.

Embodiment 2

Embodiment 1 shows a method for selectively employing two kinds of DMRS mapping according to the amount of available resources for E-PDCCH or the number of UEs multiplexed for E-PDCCH in a PRB pair. Embodiment 2 shows a method for using the same DMRS mapping as in FIG. 8(*a*) of Embodiment 1, and enabling the UE to interpret an antenna port in different ways.

In more detail, assuming that the amount of available resources for E-PDCCH is equal to or less than a predetermined level, if it is possible to estimate that E-PDCCH of a predetermined number of UEs (e.g., 4 UEs) is mapped to the corresponding PRB pair on the basis of information received from the BS (otherwise, if a predetermined number of UEs or fewer UEs receive information regarding E-PDCCH transmission within the corresponding PRB pair from the BS), the UE may recognize a DMRS port 9 received from the BS as a DMRS port 11, and may recognize a DMRS port 10 received from the BS as a DMRS port 13.

That is, if the BS may directly or indirectly inform the UE of specific information indicating that a predetermined number of UEs or fewer UEs receive E-PDCCH in the corresponding PRB pair, DMRS port mapping can be carried out as shown in Table 2.

TABLE 2

| DMRS port signaled by eNB | Real DMRS port transmitted by eNB |
| --- | --- |
| 7 | 7 |
| 8 | 8 |
| 9 | 11 |
| 10 | 13 |

As can be seen from Table 2, if UEs 1, 2, 3, and 4 respectively receive signaling information of Ports 7, 8, 9, and 10 through a DMRS port, it can be appreciated that UE1 uses Port 7, UE2 uses Port 8, UE3 uses Port 11, and UE4 uses Port 13.

In Embodiment 2, the DMRS port mapping need not be changed. In order to estimate the number of UEs of the PRB pair, the BS may inform the UE of the number of CCEs, the number of UEs configured to receive E-PDCCH in the corresponding PRB pair, and the number of ports used in E-PDCCH transmission.

Embodiment 1 and Embodiment 2 may be selectively applied to the system. In more detail, the BS may indicate an activation/deactivation message of methods of Embodiments 1 and 2 through RRC signaling or the like. That is, if the activation/deactivation message indicates activation, the methods of Embodiments 1 and 2 can be applied to the system.

Figure 9:
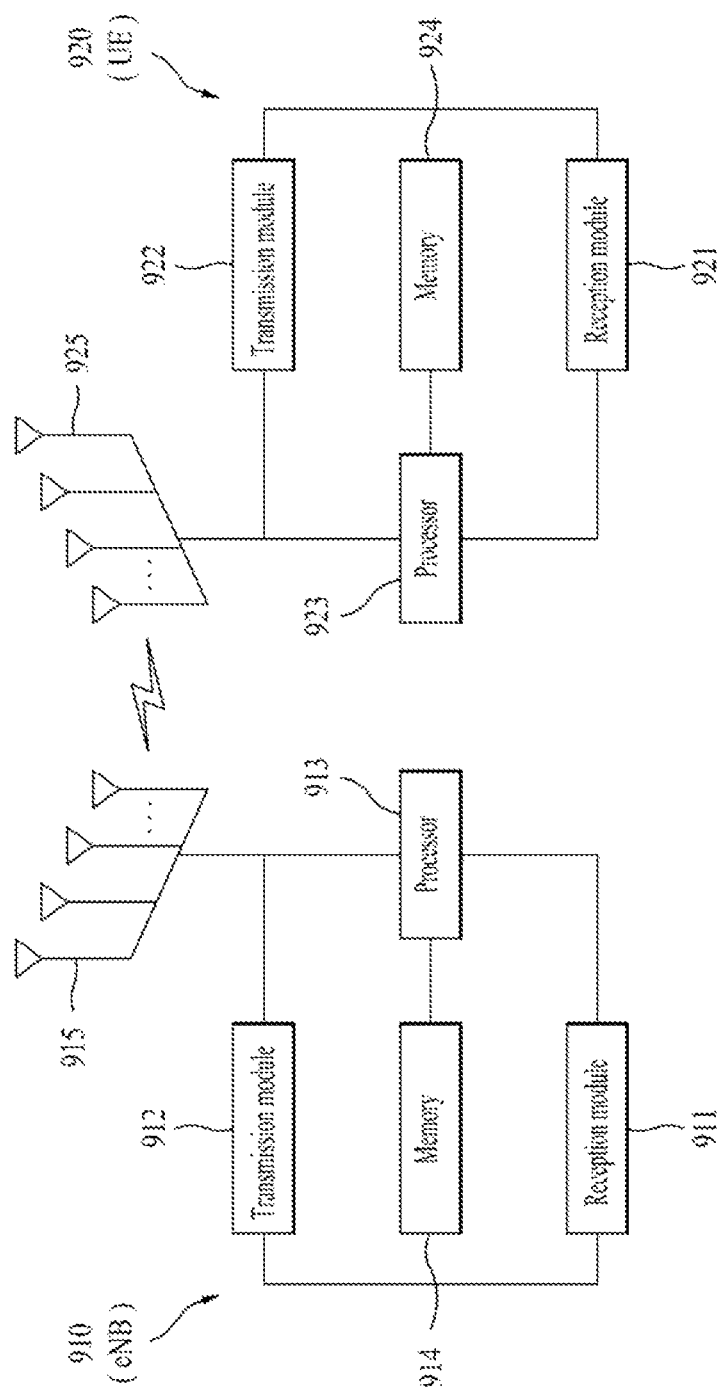
FIG. 9 is a block diagram illustrating a transceiver apparatus applicable to embodiments of the present invention.

FIG. 9 is a block diagram illustrating a transmission (Tx) point apparatus and a UE device according to embodiments of the present invention.

Referring to FIG. 9, the transmission point apparatus 910 according to the present invention may include a reception (Rx) module 911, a transmission (Tx) module 912, a processor 913, a memory 914, and a plurality of antennas 915. The plurality of antennas 915 indicates a transmission point apparatus for supporting MIMO transmission and reception. The reception (Rx) module 911 may receive a variety of signals, data and information on an uplink starting from the UE. The Tx module 912 may transmit a variety of signals, data and information on a downlink for the UE. The processor 913 may provide overall control to the transmission point apparatus 910.

The processor 913 of the transmission (Tx) point apparatus 910 according to one embodiment of the present invention can process various operations needed for the above-mentioned measurement report, handover, random access, etc.

The processor 913 of the transmission point apparatus 910 processes information received at the transmission point apparatus 910 and transmission information to be transmitted externally. The memory 914 may store the processed information for a predetermined time. The memory 914 may be replaced with a component such as a buffer (not shown).

Referring to FIG. 9, the UE device 920 may include an Rx module 921, a Tx module 922, a processor 923, a memory 924, and a plurality of antennas 925. The plurality of antennas 925 indicates a UE apparatus supporting MIMO transmission and reception. The Rx module 921 may receive downlink signals, data and information from the BS (eNB). The Tx module 922 may transmit uplink signals, data and information to the BS (eNB). The processor 923 may provide overall control to the UE device 920.

The processor 923 of the UE device 920 according to one embodiment of the present invention can process various operations needed for the above-mentioned measurement report, handover, random access, etc.

The processor 923 of the UE device 920 processes information received at the UE apparatus 920 and transmission information to be transmitted externally. The memory 924 may store the processed information for a predetermined time. The memory 924 may be replaced with a component such as a buffer (not shown).

The specific configurations of the transmission point apparatus and the UE device may be implemented such that the various embodiments of the present invention are performed independently or two or more embodiments of the present invention are performed simultaneously. Redundant matters will not be described herein for clarity.

The description of the transmission point apparatus 910 shown in FIG. 9 may be applied to a relay node (RN) acting as a DL transmission entity or UL reception entity without departing from the scope or spirit of the present invention. In addition, the description of the UE device 920 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for transmitting a reference signal by a base station (BS) in a wireless communication system, the method comprising:
   generating a reference signal sequence;
   applying an orthogonal sequence to the reference signal sequence; and
   mapping the reference signal sequence to which the orthogonal sequence is applied to a resource for each antenna port,
   wherein one antenna port is included any one of first and second antenna port sets, and a configuration of antenna ports contained in each antenna port set is changed according to a number of available resource elements (REs) of a physical resource block (PRB) pair, and
   wherein if the number of available REs is lower than a predetermined threshold value, the first antenna port set includes antenna ports corresponding to orthogonal sequences capable of performing despreading using any one of spreading factors 2 and 4, and the second antenna port set includes antenna ports corresponding to orthogonal sequences capable of performing despreading using the spreading factor of 4.

2. The method according to claim 1, wherein if the number of available REs is less than a predetermined threshold value and 4 or fewer antenna ports are used, only 12 demodulation reference signals (DMRSs) REs are used for a user equipment (UE) decoding the reference signal.

3. The method according to claim 2, wherein the first antenna port set includes antenna ports 7, 8, 9, and 10, and the second antenna port set includes antenna ports 11, 12, 13, and 14.

4. The method according to claim 3, wherein if the number of available REs is higher than a predetermined threshold value, the first antenna port set includes antenna ports 7, 8, 11, and 13, and the second antenna port set includes antenna ports 9, 10, 12, and 14.

5. The method according to claim 3, wherein the BS primarily uses antenna ports contained in the first antenna port set when data is mapped to a resource for each antenna port.

6. The method according to claim 3, wherein the number of available REs indicates resource elements available in an Enhanced-Physical Downlink Control Channel (E-PDCCH).

7. The method according to claim 3, wherein resources mapped to the reference signal sequence to which the orthogonal sequence is applied are identical to each other within one antenna port set.

8. The method according to claim 1, wherein the reference signal is a demodulation reference signal (DMRS) for decoding an Enhanced—Physical Downlink Control Channel (E-PDCCH).

9. The method according to claim 1, wherein if a subframe to which the reference signal is transmitted is a special subframe, the first antenna port set includes antenna ports corresponding to orthogonal sequences capable of performing despreading using any one of spreading factors 2 and 4, and the second antenna port set includes antenna ports corresponding to orthogonal sequences capable of performing despreading using the spreading factor of 4.

10. The method according to claim 1, wherein if the number of UEs multiplexed on the PRB pair is lower than a predetermined value, the first antenna port set includes antenna ports corresponding to orthogonal sequences capable of performing despreading using any one of spreading factors 2 and 4, and the second antenna port set includes antenna ports corresponding to orthogonal sequences capable of performing despreading using the spreading factor of 4.

11. The method according to claim 1, wherein the number of antenna ports for transmission of the reference signal is identical to the number of user equipments (UEs) multiplexed on the PRB pair.

12. The method according to claim 1, wherein the first antenna port set includes antenna ports 7, 8, 9, and 10, and the second antenna port set includes antenna ports 11, 12, 13, and 14.

13. A base station (BS) device for use in a wireless communication system, the BS device comprising:
   a transmission (Tx) module; and
   a processor,
   wherein the processor is configured to:
      generate a reference signal sequence,
      apply an orthogonal sequence to the reference signal sequence, and
      map the reference signal sequence to which the orthogonal sequence is applied to a resource for each antenna port,
   wherein one antenna port is included any one of first and second antenna port sets, and a configuration of antenna ports contained in each antenna port set is changed according to a number of available resource elements (REs) of a physical resource block (PRB) pair, and
   wherein if the number of available REs is lower than a predetermined threshold value, the first antenna port set includes antenna ports corresponding to orthogonal sequences capable of performing despreading using any one of spreading factors 2 and 4, and the second antenna port set includes antenna ports corresponding to orthogonal sequences capable of performing despreading using the spreading factor of 4.

* * * * *